(12) United States Patent
Jeon

(10) Patent No.: US 7,633,402 B2
(45) Date of Patent: Dec. 15, 2009

(54) SLIDING MECHANISM

(75) Inventor: Youn Jae Jeon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 11/523,155

(22) Filed: Sep. 18, 2006

(65) Prior Publication Data
US 2007/0008164 A1 Jan. 11, 2007

Related U.S. Application Data

(63) Continuation of application No. 10/824,853, filed on Apr. 14, 2004, now Pat. No. 7,193,523.

(30) Foreign Application Priority Data
Apr. 15, 2003 (KR) .................... 10-2003-0023757

(51) Int. Cl.
*G08B 21/00* (2006.01)
(52) U.S. Cl. ................ 340/686.2; 340/686.1; 340/687; 340/689; 340/686.3; 340/686.4
(58) Field of Classification Search ............. 340/686.1, 340/686.2, 687, 689, 686.3, 686.4; 200/51.1
See application file for complete search history.

(56) References Cited
U.S. PATENT DOCUMENTS

| | | | | |
|---|---|---|---|---|
| 4,403,515 A | * | 9/1983 | Iwasaki | .................. 324/207.24 |
| 4,420,232 A | * | 12/1983 | Mischenko | ................... 353/25 |
| 4,429,219 A | * | 1/1984 | Yochum et al. | ............. 250/229 |
| 6,009,338 A | * | 12/1999 | Iwata et al. | .............. 455/575.4 |
| 7,006,007 B1 | * | 2/2006 | Bolouri-Saransar | .... 340/825.49 |
| 7,103,396 B2 | * | 9/2006 | Kubo et al. | .............. 455/575.4 |
| 7,136,688 B2 | * | 11/2006 | Jung et al. | ................ 455/575.4 |
| 2003/0073414 A1 | * | 4/2003 | P. Capps | ...................... 455/90 |

FOREIGN PATENT DOCUMENTS

| | | |
|---|---|---|
| EP | 0792054 | 8/1997 |
| EP | 0792055 | 8/1997 |
| EP | 1075125 | 2/2001 |
| JP | 09-205476 | 8/1997 |
| JP | 11130271 | 5/1999 |
| JP | 2002-152347 | 5/2002 |

* cited by examiner

*Primary Examiner*—Daryl Pope
(74) *Attorney, Agent, or Firm*—Lee, Hong, Degerman, Kang & Waimey

(57) ABSTRACT

A sliding mechanism includes at least one member adapted to slide along at least one body wall. The body wall and the sliding member are adapted to mate in at least one designated location when the sliding member is pushed into frictional sliding contact with the body wall from an initial location. A motion detector is operatively coupled to the sliding member. A controller is operatively coupled to the motion detector and adapted to determine whether the sliding member has moved from the initial location to the designated location based on input from the motion detector.

1 Claim, 3 Drawing Sheets

SLIDING MECHANISM

CROSS-REFERENCE TO RELATED APPLICATIONS

Pursuant to 35 U.S.C. 5 119(a), this application claims the benefit of earlier filing date and right of priority to Korean Patent Application No. 10-2003-0023757, filed on Apr. 15, 2003, the contents of which is hereby incorporated by reference in its entirety. This application is a continuation of U.S. patent application Ser. No. 10/824,853, filed Apr. 14, 2004, now U.S. Pat. No. 7,193,523.

BACKGROUND OF THE INVENTION

1. Field of the Invention

The present invention relates generally to communication devices and more particularly to a sliding mechanism for a communication terminal cover.

2. Description of the Related Art

Mobile communication terminals equipped with slide covers have been known for some time. FIG. 1 schematically depicts a conventional mobile communication terminal having a cover 10 adapted to slide relative to a main body part 20. A Hall effect switch 30 is provided at one side of main body part 20 with a corresponding magnet 40 being provided on cover part 10, as shown in FIG. 1.

Hall effect switch 30 senses relative positional movement of magnet 40 and outputs a corresponding signal to a controller (not shown) notifying the controller whether cover part 10 is in an open/closed state relative to main body part 20. When cover part 10 is being slidably closed, magnet 40 moves within operational range of Hall effect switch 30 and Hall effect switch 30 is turned on. When cover part 10 is being slidably opened, magnet 40 moves out of operational range of Hall effect switch 30 and Hall effect switch 30 is turned off.

FIG. 2 is a flow chart of a conventional slide-type mobile communication terminal operation. After the controller is initiated, as shown by "start" step 42, the controller checks whether slide cover part 10 is in an open state relative to main body part 20, step 44. If slide cover part 10 is in an open state, the controller operates the mobile communication terminal in a communication mode, step 46. If slide cover part 10 is not in an open state, the controller checks whether slide cover part 10 is in a closed state relative to main body part 20, step 48. If the answer is in the affirmative, the controller operates the mobile communication terminal in a standby mode, step 50. If the answer is in the negative, the controller performs step 44, as shown in FIG. 2.

The above-described conventional setup unfortunately recognizes only two states (open/closed) for slide cover part 10 and operates the mobile communication terminal in only two modes, namely, communication and standby modes.

SUMMARY OF THE INVENTION

In accordance with one aspect of the present invention, a sliding mechanism comprises at least one member adapted to slide along at least one body wall. The body wall and the sliding member are adapted to mate in at least one designated location when the sliding member is pushed into frictional sliding contact with the body wall from an initial location. The sliding mechanism also comprises means for determining whether the sliding member has moved from the initial location to the designated location.

In accordance with another aspect of the present invention, a sliding mechanism comprises at least one member adapted to slide along at least one body wall. The body wall and the sliding member are adapted to mate in at least one designated location when the sliding member is pushed into frictional sliding contact with the body wall from an initial location. The sliding mechanism also comprises a motion detector being operatively coupled to the sliding member. A controller is operatively coupled to the motion detector and adapted to determine whether the sliding member has moved from the initial location to the designated location based on input from the motion detector.

In accordance with yet another aspect of the present invention, a method for determining the open state of a slide cover part relative to a main body part of a communication terminal comprises the steps of generating slide cover part motion data, processing the motion data to determine whether the slide cover part is in a slightly open state, generating an alarm message if the slide cover part is determined to be in a slightly open state, processing the motion data to determine whether the slide cover part is in a half way open state if the slide cover part is determined not to be in a slightly open state, generating an automatic response if the slide cover part is determined to be in a half way open state, processing the motion data to determine whether the slide cover part is open enough to fully display the communication terminal screen if the slide cover part is determined not to be in a half way open state, operating the communication terminal in communication mode if the slide cover part is open enough to fully display the communication terminal screen, processing the motion data to determine whether the slide cover part is in a fully open state if the slide cover part is determined not to be open enough to fully display the communication terminal screen, and operating the communication terminal in multimedia mode if the slide cover part is in a fully open state.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1-6. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
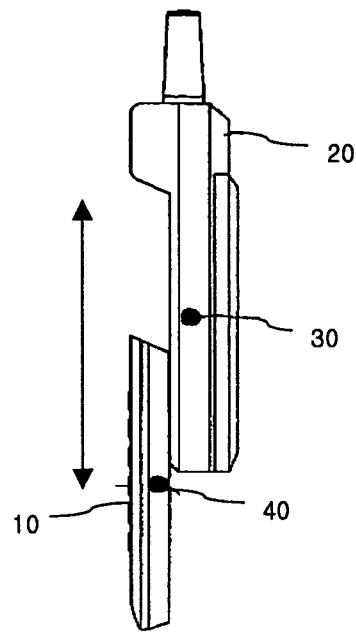
FIG. 1 schematically depicts a conventional slide-type mobile communication terminal.
Figure 2:
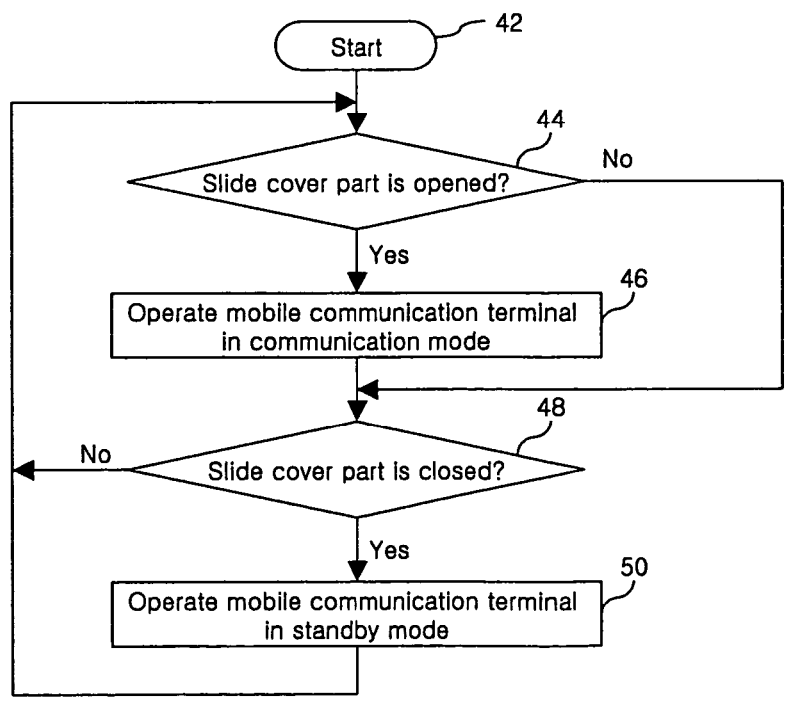
FIG. 2 is a flow chart of a conventional slide-type mobile communication terminal operation.
Figure 3:
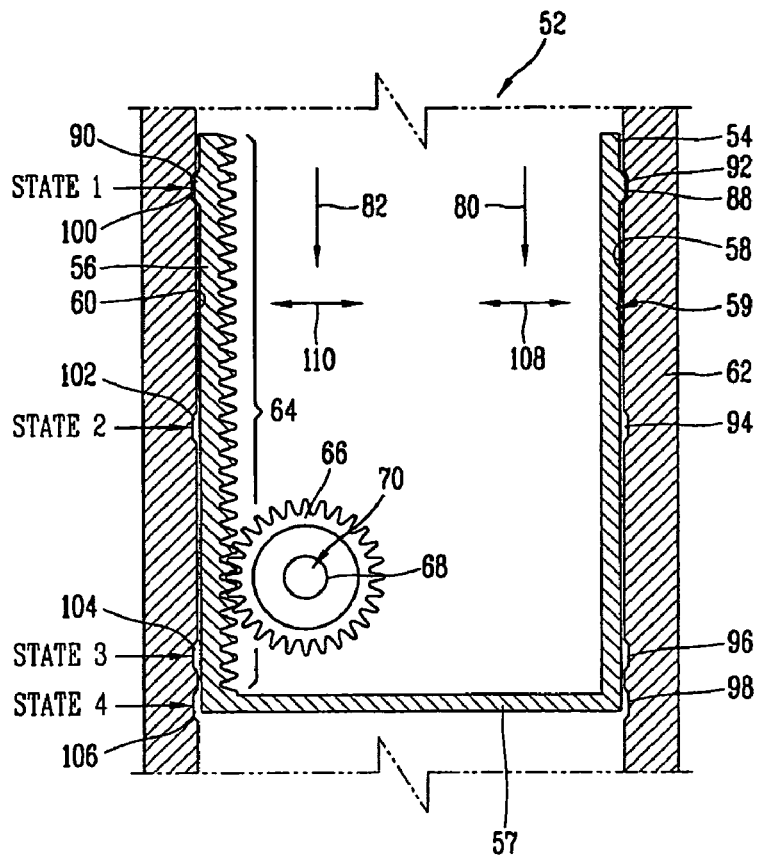
FIG. 3 schematically illustrates a sliding mechanism in accordance with one embodiment of the present invention.

FIG. 3 schematically illustrates a sliding mechanism 52 in accordance with a preferred embodiment of the present invention. Sliding mechanism 52 may be used to slidably open/close a cover relative to a main body part of a mobile communication terminal. Sliding mechanism 52 comprises first and second oppositely disposed sliding members 54, 56 adapted on one side for slidable contact with inner walls 58, 60, respectively, of a main body part 62 of a mobile communication terminal. Sliding members 54, 56 are connected at one end via an integral cross bar 57 forming in part a generally U-shaped slide cover part 59 of the mobile communication terminal.

Sliding member 56 is provided on an opposite side with a set of gear teeth 64, i.e. it is configured as a rack. Gear teeth 64 are adapted to mesh with a corresponding set of gear teeth on a pinion gear 66. Pinion gear 66 is coupled to a rotatable shaft 68 with shaft 68 being in turn operatively coupled to a motion detector 70. Motion detector 70 is adapted to sense the extent of rotational movement of pinion gear 66 as rack (sliding member) 56 of slide cover part 59 slides along inner wall 60 of main body part 62. A person skilled in the art would appreciate that the functionality provided by the rack-and-pinion setup of FIG. 3 may be implemented by various other means as long as such other means reside within the intended scope of the present invention.

Figure 4:
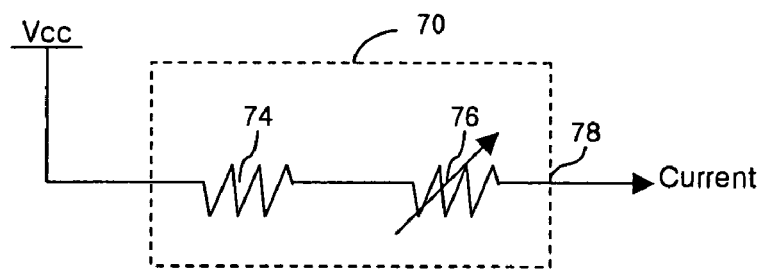
FIG. 4 schematically depicts a motion detector for use in the sliding mechanism of FIG. 3.
Figure 5:
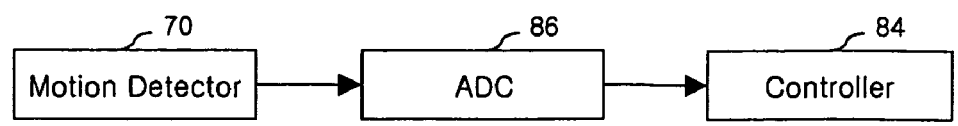
FIG. 5 schematically depicts a controller being operatively coupled to the motion detector of FIG. 4.

As generally depicted in FIG. 4, motion detector 70 comprises a load resistor 74 connected in series with a variable resistor 76 with both resistors being operatively coupled between a voltage supply source $V_{cc}$ and a current output terminal 78. The electrical resistance value of variable resistor 76 is preferably varied in direct proportion to the displacement which slide cover part 59 undergoes as sliding members 54, 56 slide along inner walls 58, 60 (of main body part 62), respectively, as generally illustrated by directional arrows 80, 82 of FIG. 3. A change in resistance value of variable resistor 76 would thus correspond to a respective change in displacement of slide cover part 59. The resulting output current is fed to a controller 84 for processing via an analog-to-digital converter (ADC) 86, as schematically depicted in FIG. 5. Controller 84 determines whether slide cover part 59 is open or closed relative to main body part 62 and, if open, to what extent, based on current input from motion detector 70.

Each sliding member (54, 56) is equipped with a generally trapezoidal flange (88, 90) integrally formed on the side that is in frictional contact with a respective inner wall (58, 60) of main body part 62. Each flange protrudes toward a respective inner wall of main body part 62. Flanges 88, 90 are symmetrically disposed proximate to the free end of each sliding member (54, 56). Flanges 88, 90 are adapted to mate with corresponding pairs of lateral grooves formed successively on inner walls 58, 60 of main body part 62, as generally depicted in FIG. 3.

For example, flange 88 is adapted to mate with grooves 92, 94, 96 and 98 formed on inner wall 58 of main body part 62 as sliding member 54 slides along inner wall 58. Each groove is adapted to receive flange 88, i.e. each groove has a matching trapezoidal configuration.

Similarly, flange 90 is adapted to mate with grooves 100, 102, 104 and 106 formed on inner wall 60 of main body part 62 as rack 56 slides along inner wall 60. Each groove is adapted to receive flange 90, i.e. each groove has a matching trapezoidal configuration. A person skilled in the art would readily appreciate that a flange/groove mating pair is not limited to a trapezoidal configuration, but may be constructed in a variety of ways such as, for example, utilizing an arcuate configuration or the like, provided there is no departure from the intended scope and spirit of the present invention. A person skilled in the art would also appreciate that the number of lateral groove pairs does not have to be limited to four, as generally illustrated in FIG. 3, but may be varied, as needed.

Each sliding member (54, 56) is adapted to flex inward/outward relative to inner walls 58, 60 of main body part 62, respectively, as generally shown by bidirectional arrows 108, 110 of FIG. 3, so as to allow flanges 88, 90 to mate with successive pairs of grooves as slide cover part 59 is pushed into frictional sliding contact with inner walls 58, 60 of main body part 62 by the mobile communication terminal user. Slide cover part 59 is in sufficiently close frictional contact with inner walls 58, 60 of main body part 62 to prevent sliding movement on its own, e.g. due to gravity, between successive pairs of grooves, i.e. when flanges 88, 90 are not in mating contact with a respective pair of grooves.

Alternatively, slide cover part 59 may be designed to slide on its own under gravity along inner walls 58, 60 between successive pairs of grooves, if such functionality is desired by the mobile communication terminal manufacturer. Other design variations may be utilized, provided such other variations do not deviate from the intended purpose of the present invention.

When slide cover part 59 is pushed forward (along directional arrows 80, 82) by the user from a closed state, flanges 88, 90 may be captured initially by lateral grooves 92, 100, respectively, depending on the force magnitude, arresting the generally linear movement of slide cover part 59 relative to main body part 62, as generally shown by "State 1" position in FIG. 3. Output current signals corresponding to the change in resistance value of variable resistor 76 (FIG. 4), which in turn corresponds to the displacement of slide cover part 59 from an initial closed state position to the "State 1" position of FIG. 3, are being sent to controller 84 for processing by motion detector 70 via ADC 86 (FIG. 5).

Figure 6:
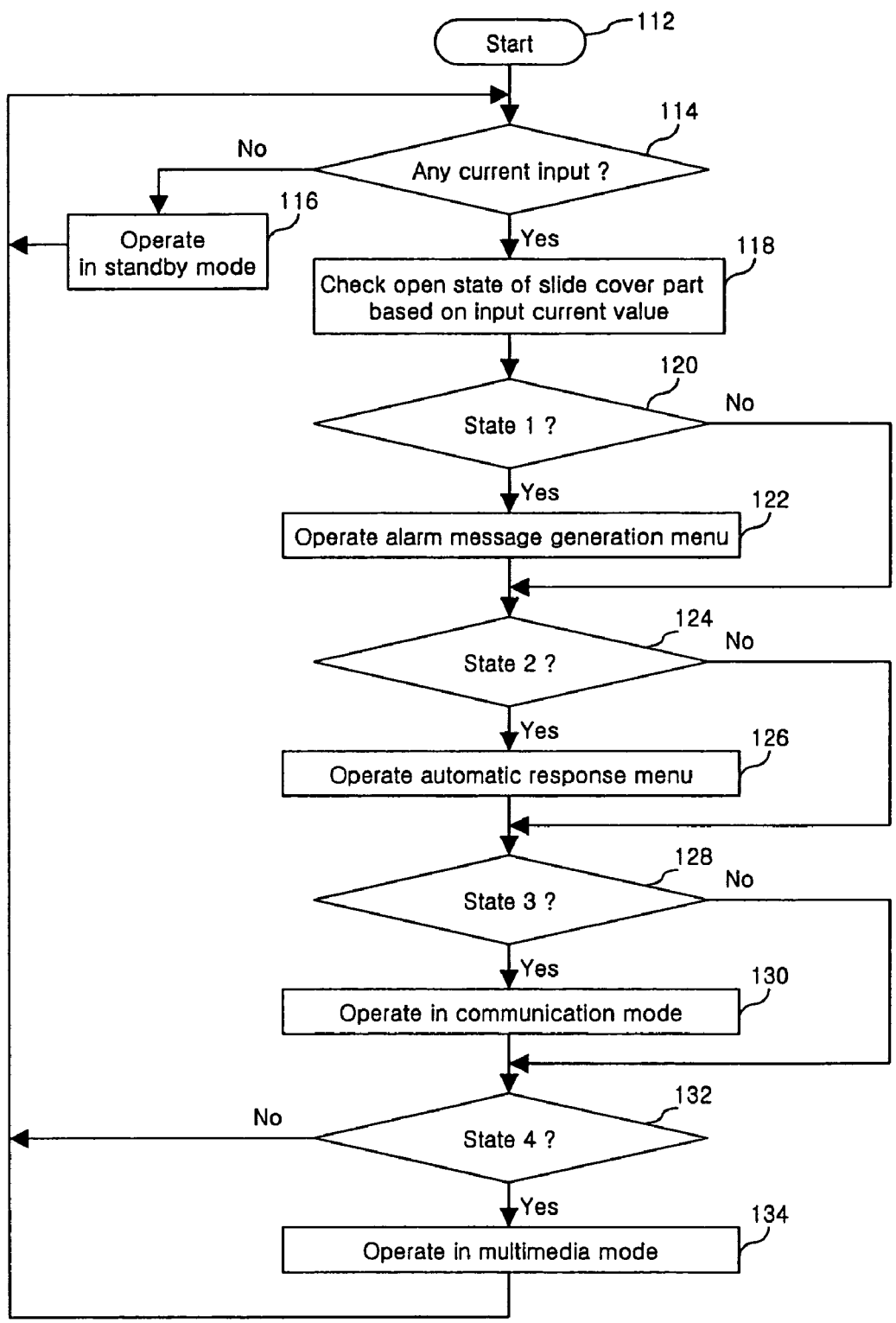
FIG. 6 is an operational flow chart in accordance with another embodiment of the present invention.

In accordance with another preferred embodiment of the present invention, the operation of sliding mechanism 52 and controller 84 may be implemented as generally illustrated in reference to FIG. 6. Specifically, after controller 84 is initialized, i.e. "Start" step 112 (FIG. 6) has been performed, controller 84 checks whether there is any current input, step 114 (FIG. 6). If the answer is in the negative, controller 84 operates the mobile communication terminal in standby mode, step 116 (FIG. 6), and subsequently repeats step 114. In this case, slide cover part 59 is in a closed state.

If the answer is in the affirmative, slide cover part 59 is in an open state. What remains to be determined is the extent to which slide cover part 59 is open. Specifically, controller 84 checks the open state of slide cover part 59 based on input current value, step 118 (FIG. 6), to determine whether one of four pre-set reference current values such as, for example, 10 mA, 20 mA, 30 mA, and 35 mA, matches the input current value.

For example, controller 84 may check whether slide cover part 59 is currently in "State 1" (FIG. 3), step 120 (FIG. 6). State 1 corresponds to slide cover part 59 being slightly open relative to main body part 62 with flanges 88, 90 received by lateral grooves 92, 100, respectively, as generally depicted in FIG. 3.

If the input current value matches the lowest reference current value (e.g., 10 mA), controller 84 concludes that slide cover part 59 is in "State 1" (FIG. 3). If "State 1" is maintained for a predetermined period of time, controller 84 operates an alarm message generation menu for the user, step 122 (FIG. 6), which may include an alarm message such as, for example, "slide cover is open".

After generation of the alarm message or if the input current value does not match the lowest reference current value, controller 84 may proceed to check whether slide cover part 59 is currently in "State 2" (FIG. 3), step 124 (FIG. 6). "State 2" corresponds to slide cover part 59 being generally halfway open relative to main body part 62 with flanges 88, 90 received by lateral grooves 94, 102, respectively.

If the input current value matches the second highest reference current value (e.g., 20 mA), controller 84 concludes that slide cover part 59 is in "State 2". If "State 2" is maintained for a predetermined period of time, controller 84 operates an automatic response menu, step 126 (FIG. 6), which may include automatic response messages such as, for example, "I am tied up in a meeting, please leave a message", "I am on the road, please leave a message", "I am in rest mode, please call in a couple of hours", etc.

After generation of an appropriate automatic response message or if the input current value does not match the second highest reference current value, controller 84 may proceed to check whether slide cover part 59 is currently in "State 3" (FIG. 3), step 128 (FIG. 6). State 3 corresponds to slide cover part 59 being open enough to fully display the mobile communication terminal liquid crystal display (LCD) screen. In this case, flanges 88, 90 are received by lateral grooves 96, 104, respectively.

If the input current value matches the third highest reference current value (e.g., 30 mA), controller 84 concludes that slide cover part 59 is in "State 3". If "State 3" is maintained for a predetermined period of time, controller 84 operates the mobile communication terminal in communication mode, step 130 (FIG. 6), and displays a corresponding menu on the LCD screen.

After operation of the communication mode menu or if the input current value does not match the third highest reference current value, controller 84 may proceed to check whether slide cover part 59 is currently in "State 4" (FIG. 3), step 132 (FIG. 6). State 4 corresponds to slide cover part 59 being fully open relative to main body part 62 with an exposed mobile communication terminal camera. In this case, flanges 88, 90 are received by lateral grooves 98, 106, respectively.

If the input current value matches the fourth highest reference current value (e.g., 35 mA), controller 84 concludes that slide cover part 59 is in "State 4". If "State 4" is maintained for a predetermined period of time, controller 84 operates the mobile communication terminal in multimedia mode, step 134 (FIG. 6), and displays a corresponding menu on the LCD screen.

After operation of the multimedia mode menu or if the input current value does not match the fourth highest reference current value, controller 84 may repeat step 114, as generally shown in FIG. 6.

A person skilled in the art would recognize that the above-described novel sliding mechanism is not restricted to mobile telephone terminal applications, but may be implemented in a variety of other suitable applications. Other components and/or configurations may be utilized in the above-described embodiments.

For example, sliding members 54, 56 may be operatively coupled to respective outer (instead of inner) walls of main body part 62. Furthermore, sliding member 54 (instead of sliding member 56) may be configured as a gear rack adapted to mesh with pinion 66. In such case, pinion 66 would be operatively coupled to rack 54. Moreover, the sliding mechanism of the present invention may utilize two (instead of one) rack-and-pinion mechanisms to achieve the general functionality described hereinabove. Also, the above-described functionality may be adapted to incorporate more or less than four operational states (modes), as needed.

All terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

Many other applications and/or alterations may be utilized provided that such other applications and/or alterations do not deviate from the intended purpose of the present invention. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. A sliding mechanism, comprising:
    a sliding member in frictional contact with and adapted to slide along a body wall comprising a plurality of detents, wherein each detent is located to position the sliding member relative to the body wall at one of a plurality of predetermined locations;
    a detector adapted to detect a location of the sliding member with respect to the body wall, wherein the detector provides an electrical signal proportional to the position of the sliding member with respect to the body wall; and
    a controller operatively coupled to the detector to process the detected location of the sliding member and to determine whether the sliding member is located at one of the plurality of predetermined locations.

* * * * *